(12) United States Patent
Nakagawa

(10) Patent No.: US 10,819,866 B2
(45) Date of Patent: Oct. 27, 2020

(54) PROCESSING APPARATUS AND NON-TRANSITORY COMPUTER READABLE MEDIUM

(71) Applicant: FUJI XEROX CO., LTD., Tokyo (JP)

(72) Inventor: Tomoka Nakagawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 517 days.

(21) Appl. No.: 15/489,183

(22) Filed: Apr. 17, 2017

(65) Prior Publication Data
US 2018/0063345 A1    Mar. 1, 2018

(30) Foreign Application Priority Data
Aug. 31, 2016   (JP) .................................. 2016-168723

(51) Int. Cl.
*H04N 1/00* (2006.01)
*G06F 3/12* (2006.01)

(52) U.S. Cl.
CPC ....... *H04N 1/00477* (2013.01); *G06F 3/1207* (2013.01); *G06F 3/1212* (2013.01); *G06F 3/1222* (2013.01); *G06F 3/1238* (2013.01); *G06F 3/1263* (2013.01); *G06F 3/1292* (2013.01); *H04N 1/00474* (2013.01)

(58) Field of Classification Search
CPC .... G06F 3/1205; G06F 3/1206; G06F 3/1207; G06F 3/126; G06F 3/1261; G06F 3/1263; G06F 3/1234; G06F 3/1235; G06F 3/1238; G06F 3/1239; G06F 3/1253; G06F 3/1255; G06F 3/1256; G06F 3/1292; G06F 3/1293; G06F 3/1294; H04N 1/00477; H04N 1/00474
USPC .................................................. 358/1.11–1.18
See application file for complete search history.

(56) References Cited

U.S. PATENT DOCUMENTS

| | | | |
|---|---|---|---|
| 2002/0051182 A1* | 5/2002 | Sommer | H04N 1/00408 358/1.15 |
| 2010/0231950 A1* | 9/2010 | Sawayanagi | G06F 3/1204 358/1.14 |
| 2011/0317200 A1* | 12/2011 | Honda | B41J 29/38 358/1.14 |

FOREIGN PATENT DOCUMENTS

JP    2010-212993    9/2010

OTHER PUBLICATIONS

Feb. 12, 2020 Office Action issued in Japanese Patent Application No. 2016-168723.

* cited by examiner

*Primary Examiner* — Chad Dickerson
(74) *Attorney, Agent, or Firm* — Oliff PLC

(57) ABSTRACT

A processing apparatus includes a receiving unit that receives from another apparatus a command to perform an operation that uses a first function as a function of the processing apparatus, and an instruction unit that, when the receiving unit has received the command from the other apparatus, issues to the other apparatus a command to perform an operation that uses a second function if the other apparatus has the second function that is a substitute for the first function.

6 Claims, 12 Drawing Sheets

PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-168723 filed Aug. 31, 2016.

BACKGROUND

(i) Technical Field

The present invention relates to a processing apparatus and a non-transitory computer readable medium.

(ii) Related Art

In a related art technique, a copying machine may permit a user to log in on using a personal computer (PC) in remote login. When the copying machine receives a login operation from an operator who is operating an operation panel of the copying machine while the remote login is in progress, the copying machine stores identification information of the operator and displays a job selection screen. If the operator selects memory printing, the remote login operation is in progress, and if the operator who logs in on the operation panel is the user who is performing the remote login, the copying machine accesses the PC via a local area network (LAN), and acquires information concerning a file stored in a universal serial bus (USB) memory of the PC. If the file is selected by the operator, the copying machine acquires the selected file from the PC, and performs printing in accordance with the acquired file.

When an operation to use the function of an apparatus is performed, an operator who is going to instruct the operation to be performed goes in front of the apparatus and uses the apparatus to perform the operation. In such a case, the operator is forced to wait until the apparatus is available to the operator.

SUMMARY

According to an aspect of the invention, there is provided a processing apparatus. The processing apparatus includes a receiving unit that receives from another apparatus a command to perform an operation that uses a first function as a function of the processing apparatus, and an instruction unit that, when the receiving unit has received the command from the other apparatus, issues to the other apparatus a command to perform an operation that uses a second function if the other apparatus has the second function that is a substitute for the first function.

DETAILED DESCRIPTION

Exemplary embodiment of the present invention is described in detail below.

Figure 1:
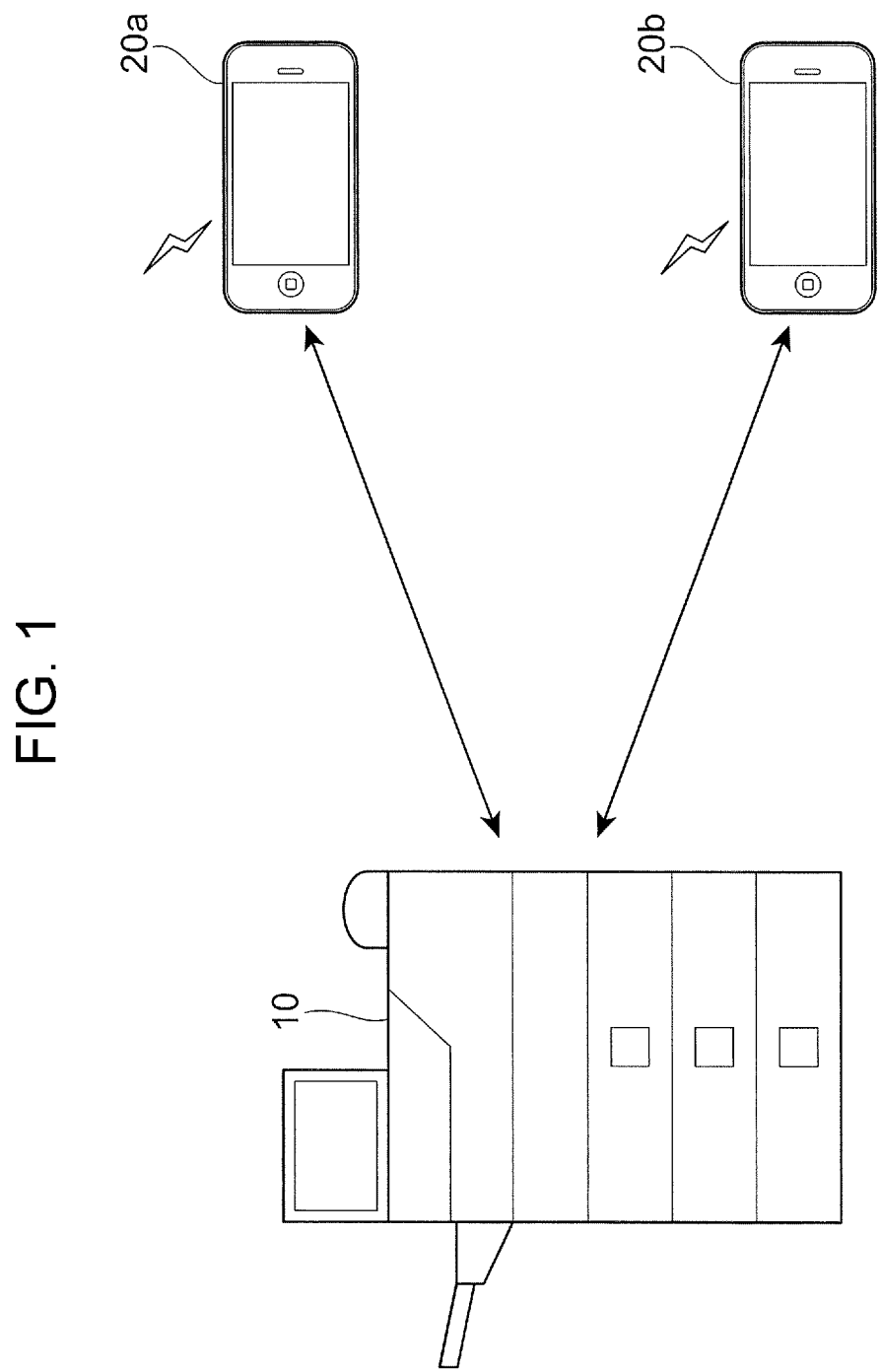
FIG. 1 generally illustrates an image processing system of an exemplary embodiment of the present invention.

FIG. 1 generally illustrates an image processing system of the exemplary embodiment of the present invention. The image processing system includes an image processing apparatus 10, and portable terminals 20a and 20b. In the following discussion, the portable terminals 20a and 20b are respectively used by a user A and a user B. If the portable terminals 20a and 20b are not discriminated from each other, the two terminals are collectively referred to as a portable terminal 20. The number of portable terminals is not limited to two.

The image processing apparatus 10 performs image forming on a recording medium, such as a paper sheet, image reading from a recording medium, image transmission to a public network, and image reception from the public network. The image processing apparatus 10 may perform at least one of these functions. If the image processing apparatus 10 performs the image forming only, the image processing apparatus 10 may be a printer. If the image processing apparatus 10 performs the image reading only, the image processing apparatus 10 may be a scanner. If the image processing apparatus 10 performs both the image reading and the image forming, the image processing apparatus 10 may be a copying machine. If the image processing apparatus 10 performs the image reading and image transmission or the image reception and image forming, the image processing apparatus 10 may be a facsimile machine. The image processing apparatus 10 may be wirelessly connected to the portable terminal 20. For example, the image processing apparatus 10 may print an image wirelessly transmitted from the portable terminal 20, or may wirelessly transmit a scanned image to the portable terminal 20. In accordance with the exemplary embodiment, the image processing apparatus 10 is an example of a processing apparatus or a first processing apparatus.

The portable terminal 20 is a computer that instructs the image processing apparatus 10 to perform the image processing. As described above, the portable terminal 20 may be wirelessly connected to the image processing apparatus 10, and may transmit an image to be printed by the image processing apparatus 10, or may receive an image read by the image processing apparatus 10. The portable terminal 20 may b a smart phone, for example. In accordance with the exemplary embodiment, the portable terminal 20 is an example of another apparatus, or a second processing apparatus.

Figure 2:
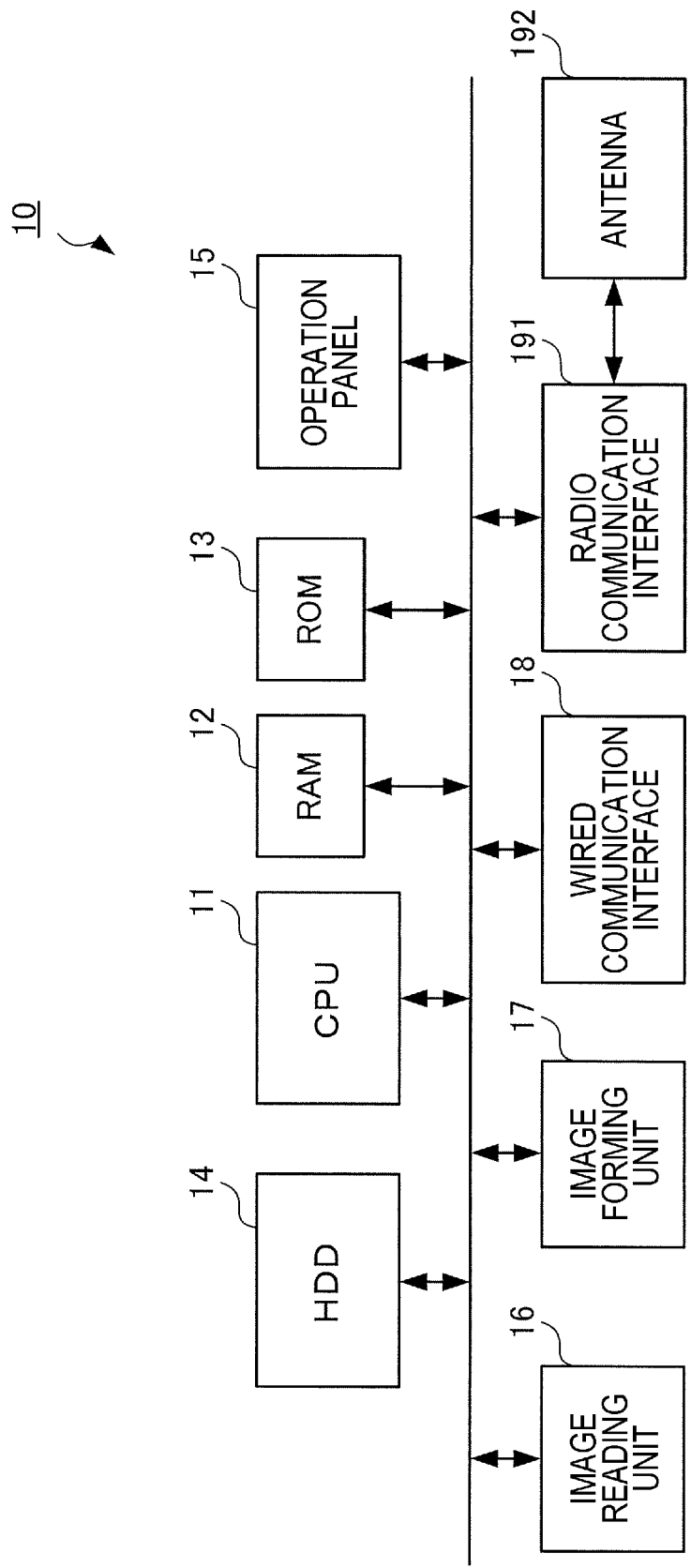
FIG. 2 illustrates a hardware configuration of the image processing apparatus of the exemplary embodiment of the present invention.

FIG. 2 illustrates a hardware configuration of the image processing apparatus 10 of the exemplary embodiment of the present invention. Referring to FIG. 2, the image processing apparatus 10 includes a central processing unit (CPU) 11, a random-access memory (RAM) 12, a read-only memory (ROM) 13, a hard disk drive (HDD) 14, an operation panel 15, an image reading unit 16, an image forming unit 17, a wired communication interface 18, a radio communication interface 191, and an antenna 192.

The CPU 11 implements functions described below by loading a variety programs from the ROM 13 or the like to the RAM 12 and by executing the programs.

The RAM 12 functions as a working memory of the CPU 11.

The ROM 13 stores a variety of programs to be executed by the CPU 11.

The HDD 14 is a magnetic disk that stores an image data read by the image reading unit 16, and image data that is used in the image forming performed by the image forming unit 17.

The operation panel 15 may be a touchpanel which displays a variety of information and receives an operation input by a user. The operation panel 15 includes a display that displays the variety of information and a location detecting sheet that detects a location pointed to by a finger, a stylus pen, or the like. Alternatively, the touchpanel may be replaced with a display and a keyboard. The operation panel 15 functions as a local UI of the image processing apparatus 10, and enables a login operation using the local UI (hereinafter referred to as a "local login"). Only a single user is concurrently permitted to perform the local login. In other words, the local login is intended to mean that a user is authorized to use an apparatus by operating the apparatus.

The image reading unit 16 reads an image recorded on a recording medium, such as a paper sheet. The image reading unit 16 is a scanner, for example. The image reading unit 16 may be a charge coupled device (CCD) system that converges, through a lens, a light beam reflected from an original document to which a light beam is directed from a light source, and receives the converged light beam, or a contact image sensor (CIS) system that receives on a CIS a light beam reflected from an original document to which a light beam is directed from a light-emitting diode (LED) light source.

The image forming unit 17 forms an image on a recording medium. The image forming unit 17 is a printer, for example. The printer may be an electrophotographic system that forms an image by transferring onto a recording medium a toner from a photoconductive drum, or an ink-jet system that forms an image by ejecting ink onto a recording medium.

The wired communication interface 18 transmits or receives a variety of information to or from another apparatus, such as a terminal apparatus like a personal computer, via a communication network (not illustrated).

The radio communication interface 191 transmits or receives a variety of information to or from the portable terminal 20 via radio communication. The radio communication includes Bluetooth (registered trademark), Wi-FiDirect (registered trademark).

The antenna 192 transmits to a radio network environment a variety of information on radio wave supplied via the radio communication interface 191, and supplies to the radio communication interface 191 a variety of information on radio wave received from the radio network environment.

Figure 3:
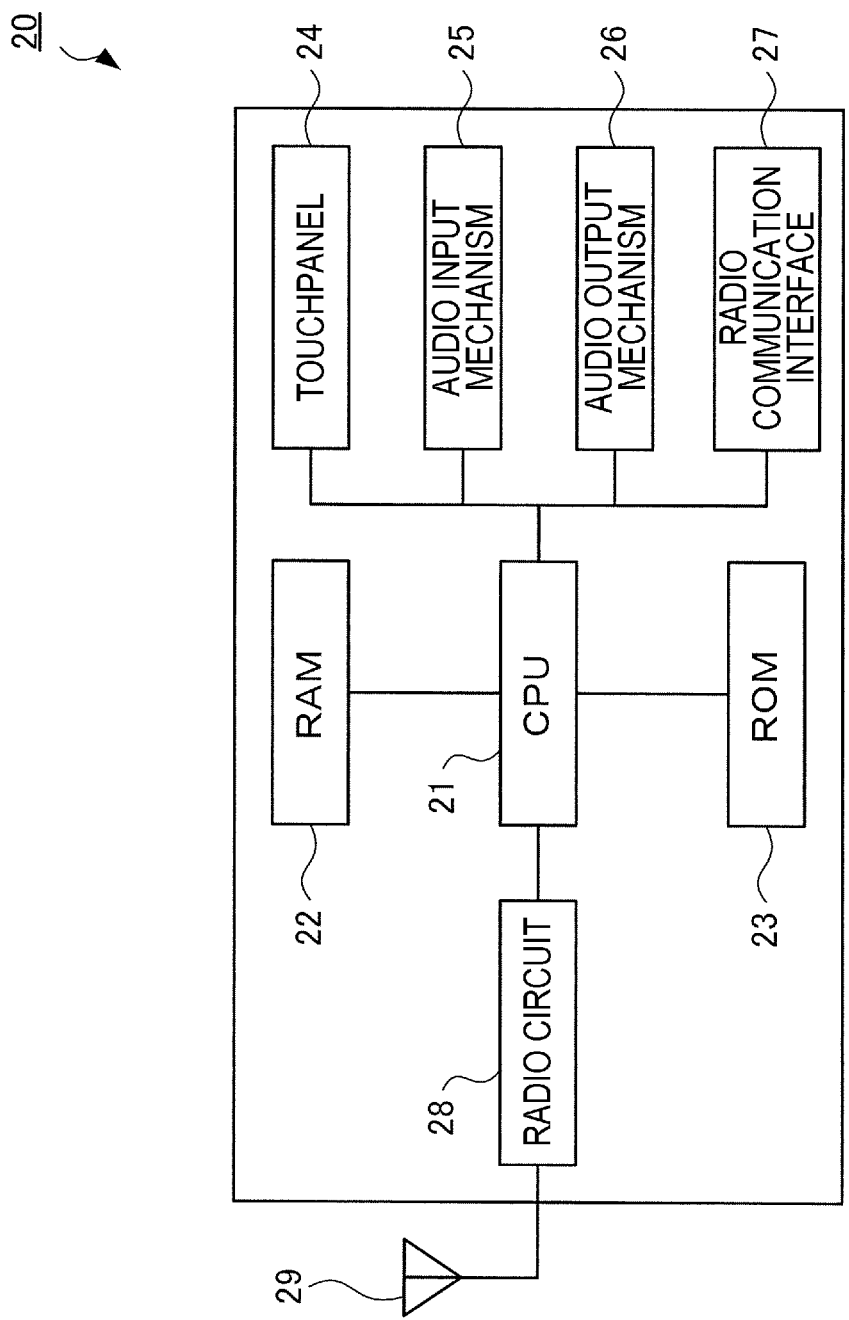
FIG. 3 illustrates a hardware configuration of a portable terminal of the exemplary embodiment of the present invention.

FIG. 3 illustrates a hardware configuration of the portable terminal 20 of the exemplary embodiment of the present invention. The portable terminal 20 includes a CPU 21 serving an arithmetic unit, a RAM 22 and a ROM 23 serving as memories, a touchpanel 24 that displays a variety of information and receives an operation input by the user, an audio input mechanism 25, such as a microphone, and an audio output module 26, such as a speaker. The touchpanel 24 also functions as a remote UI for the image processing apparatus 10, and enables a login operation using the remote UI (hereinafter referred to as a "remote login"). The image processing apparatus 10 supports multi-login in which multiple users may perform remote login. The remote login is intended to mean that a user is authorized to use an apparatus by operating another apparatus. The portable terminal 20 includes a radio communication interface 27 that transmits or receives a variety of information to or from the image processing apparatus 10 via radio communication, such as Bluetooth (registered trademark), or Wi-FiDirect (registered trademark). The image processing apparatus 10 further includes a radio circuit 28 and an antenna 29 to perform radio communication via a base station. Note that the radio circuit 28 includes a baseband large scale integrated (LSI) circuit (not illustrated) that processes a signal of digital data wirelessly transmitted or received.

In the image processing system of the exemplary embodiment, if the portable terminal 20 has the substitute function for the function of the image processing apparatus 10, the image processing apparatus 10 controls the portable terminal 20 such that the portable terminal 20 performs the image processing using the substitute function. In this case, the image processing apparatus 10 displays information concerning the function thereof or information concerning the substitute function of the portable terminal 20 on the local UI or the remote UI. The exemplary embodiment is described using a media port receiving a medium by referencing the local UI, and the remote UI.

A screen displayed first on the local UI or the remote UI at a default state is described.

Figure 4A:
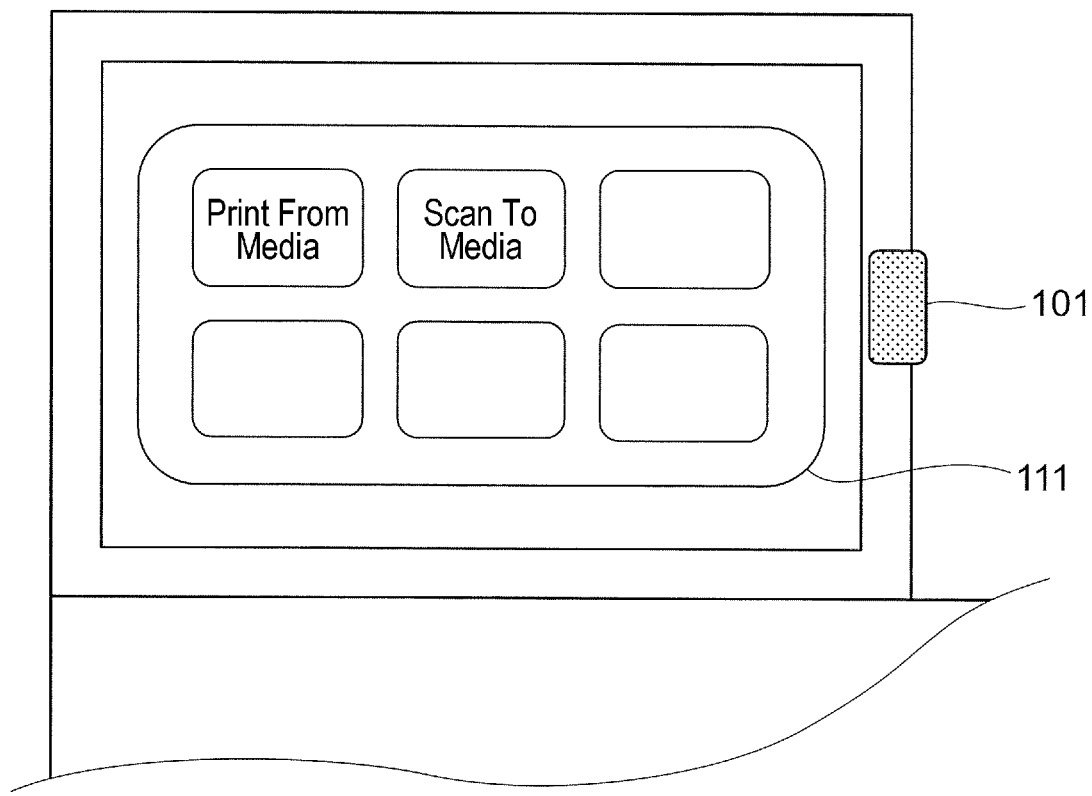
FIG. 4A illustrates an application selection screen displayed on a local user interface (UI) of the image processing apparatus.

FIG. 4A illustrates an application selection screen 111 displayed on the local UI. FIG. 4A also illustrates a media port 101 that is not part of the application selection screen 111 and is placed horizontally beside the local UI. The application selection screen 111 is used to select an application that is to be performed by the image processing apparatus 10.

Figure 4B:
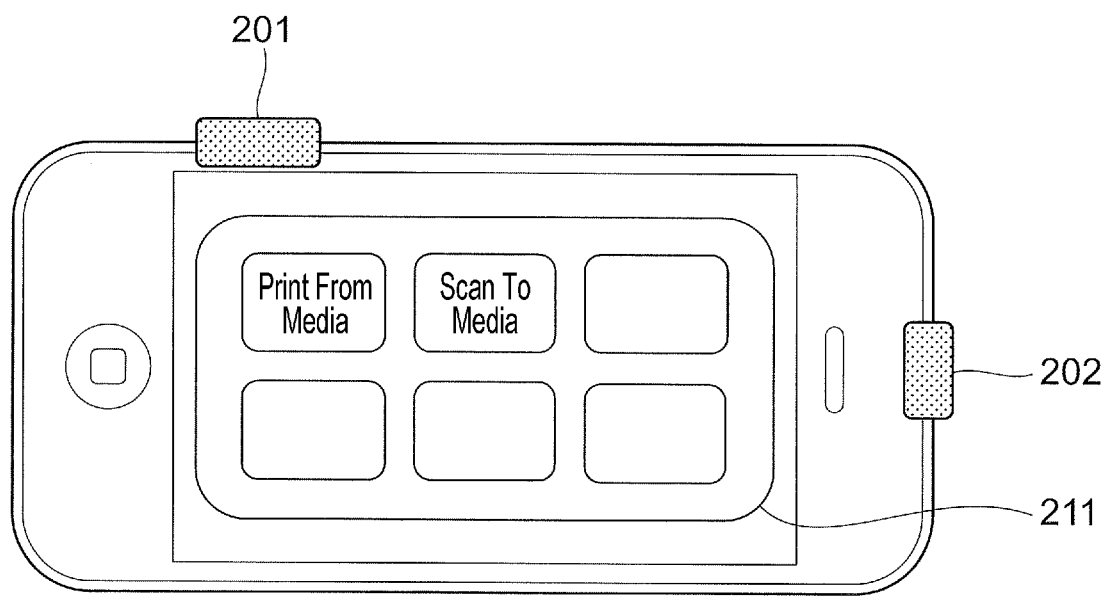
FIG. 4B illustrates an application selection screen displayed on a remote UI of the portable terminal.

FIG. 4B illustrates an application selection screen 211 displayed on the remote UI. FIG. 4B also illustrates media ports 201 and 202 that are not part of the application selection screen 211 and placed around the remote UI. The application selection screen 211 is used to select an application that is to be executed by the image processing apparatus 10.

The media include a universal serial bus (USB) memory and an SD card (registered trademark).

The application selection screen 111 and the application selection screen 211 are identical to each other. Each of the application selection screen 111 and the application selection screen 211 allows the user to select an application using media (hereinafter referred to as a "media usage application"), such as "PrintFromMedia" to print data stored on media or "ScanToMedia" to store, on media, data that has been scanned. If a media usage application is selected on the application selection screen 111, a process may be performed using a medium inserted into the media port 101. If a media usage application is selected on the application selection screen 211, a process may be performed using a medium inserted into the media port 201 or the media port 202.

The screen displayed on the local UI or the remote UI with a media usage application selected on the application selection screen 111 or 211 is described below.

Figure 5A:
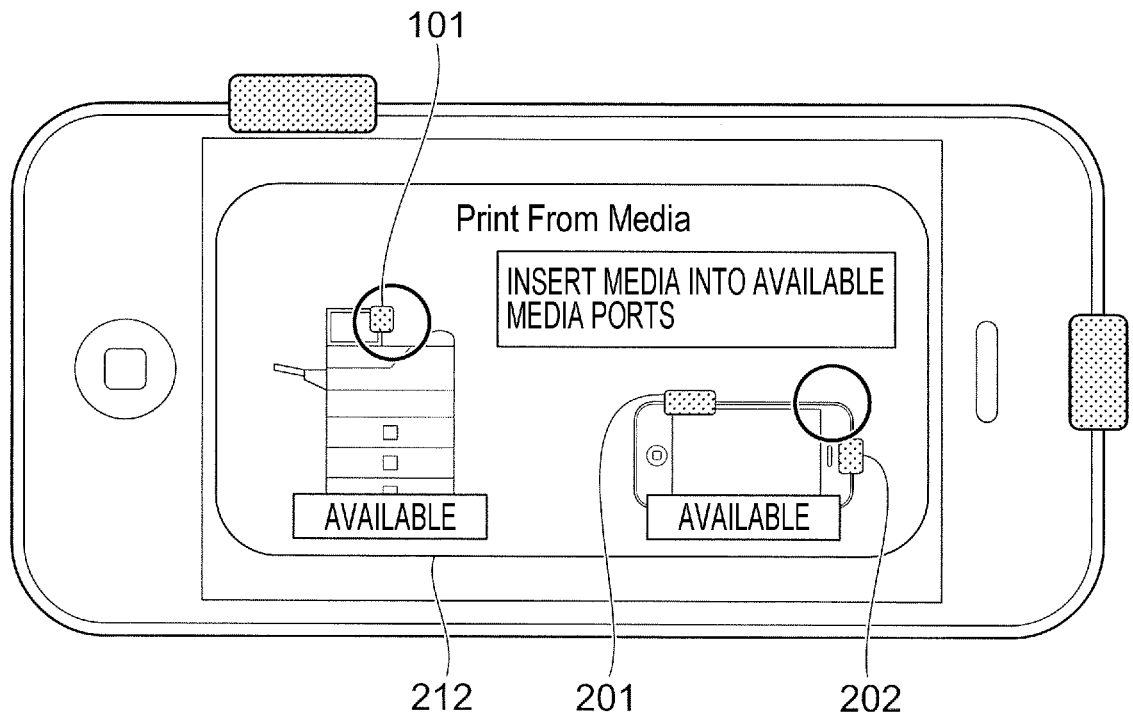
FIG. 5A and FIG. 5B illustrate a media port notification screen displayed on the remote UI of the portable terminal.
Figure 5B:
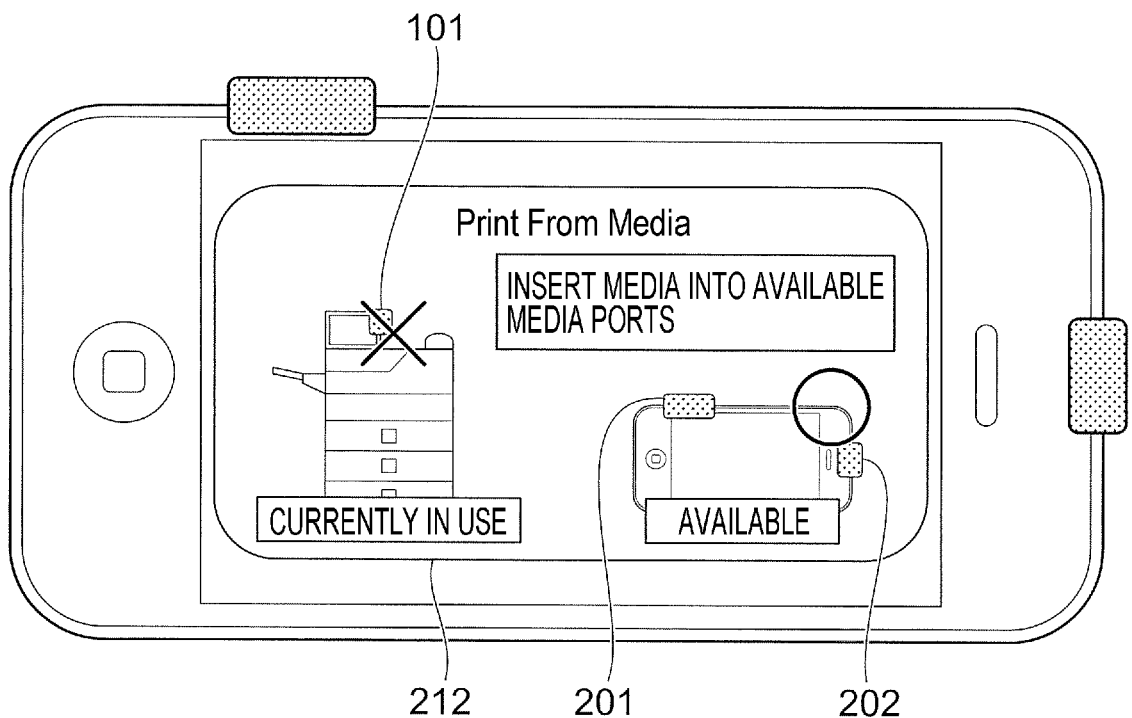

FIG. 5A and FIG. 5B illustrate media port notification screens 212 that are presented on the remote UI when a user A remotely logs in on the image processing apparatus 10 using the portable terminal 20a with no user locally logging in on the image processing apparatus 10. As illustrated in FIG. 5A and FIG. 5B, each media port notification screen 212 displays information concerning the media port 101 of the image processing apparatus 10 and information concerning the media ports 201 and 202 of the portable terminal 20. FIG. 5A indicates that the media port 101 is available because the media port 101 of the image processing apparatus 10 is presumed to be unused. On the other hand, FIG. 5B indicates that the media port 101 is not available because the media port 101 of the image processing apparatus 10 is presumed to be used.

Figure 6A:
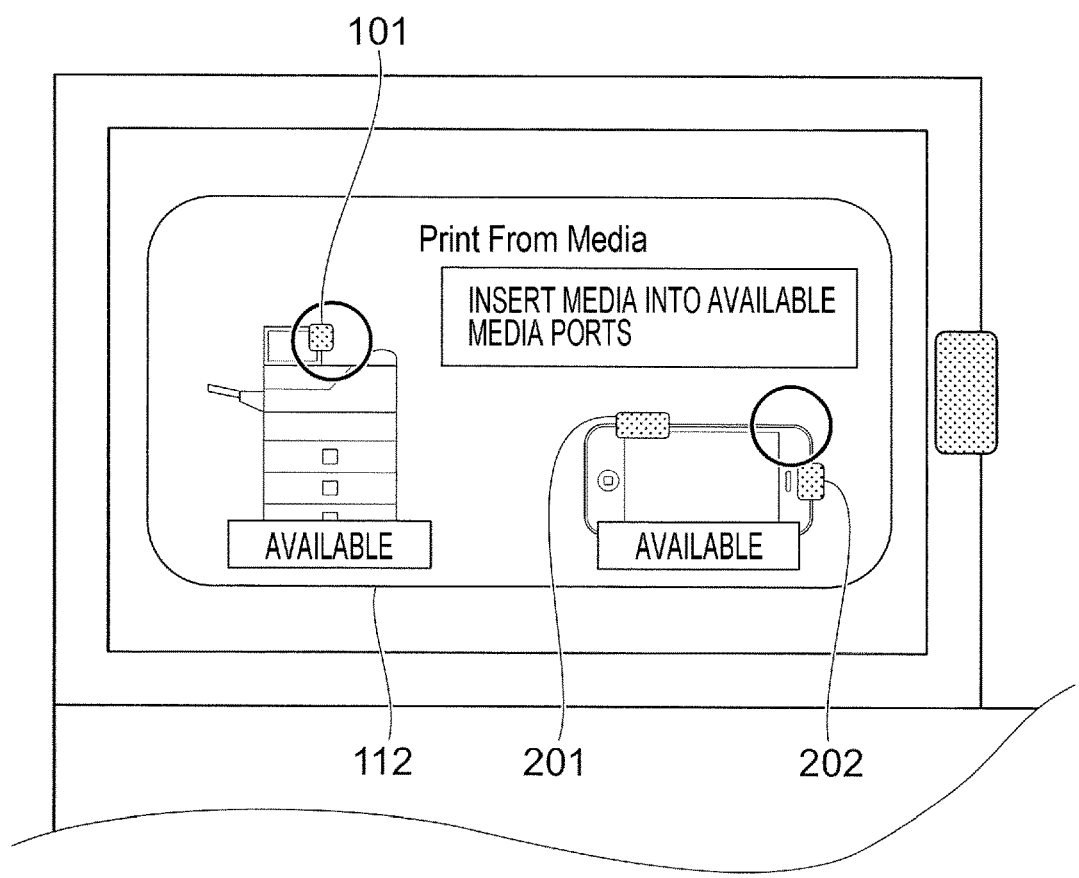
FIG. 6A illustrates a media port notification screen displayed on the local UI of the image processing apparatus.
Figure 6B:
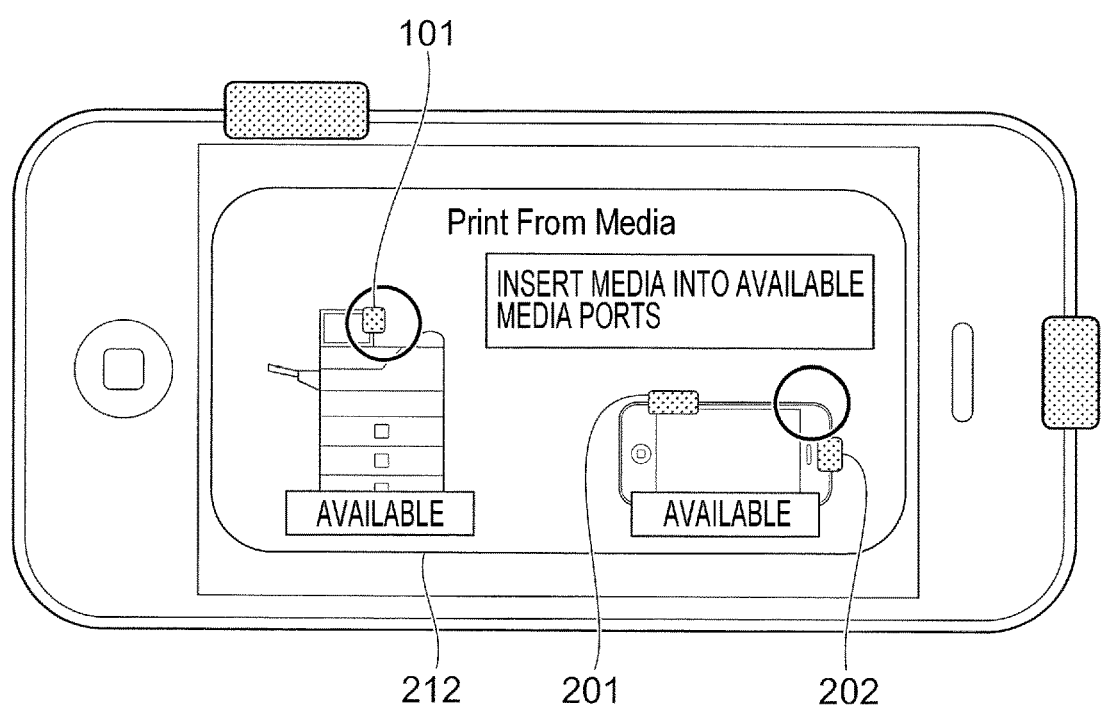
FIG. 6B illustrates a media port notification screen displayed on the remote UI of the portable terminal.

FIG. 6A and FIG. 6B respectively illustrate a media port notification screen 112 displayed on the local UI and a media port notification screen 212 displayed the remote UI when the user A locally logs in on the image processing apparatus 10 while remotely logs in on the image processing apparatus 10 using the portable terminal 20a. As illustrated in FIG. 6A and FIG. 6B, the media port notification screen 112 displayed on the local UI and the media port notification screen 212 displayed the remote UI are identical to each other. Each of the media port notification screens 112 and 212 displays information concerning the media port 101 of the image processing apparatus 10 and information concerning the media ports 201 and 202 of the portable terminal 20. Since both the media port 101 of the image processing apparatus 10 and the media ports 201 and 202 of the portable terminal 20 are presumed to be unused, FIG. 6A and FIG. 6B indicate that the media ports 101, 201, and 202 are available. In this case, the user A remotely logs in using a single portable terminal 20, information concerning the media port of the single portable terminal 20 is displayed. If the user A remotely logs in using multiple portable terminals 20, information concerning the media ports of the portable terminals 20 includes the number of pieces of information corresponding to the number of portable terminals 20 used in the remote login.

Figure 7A:
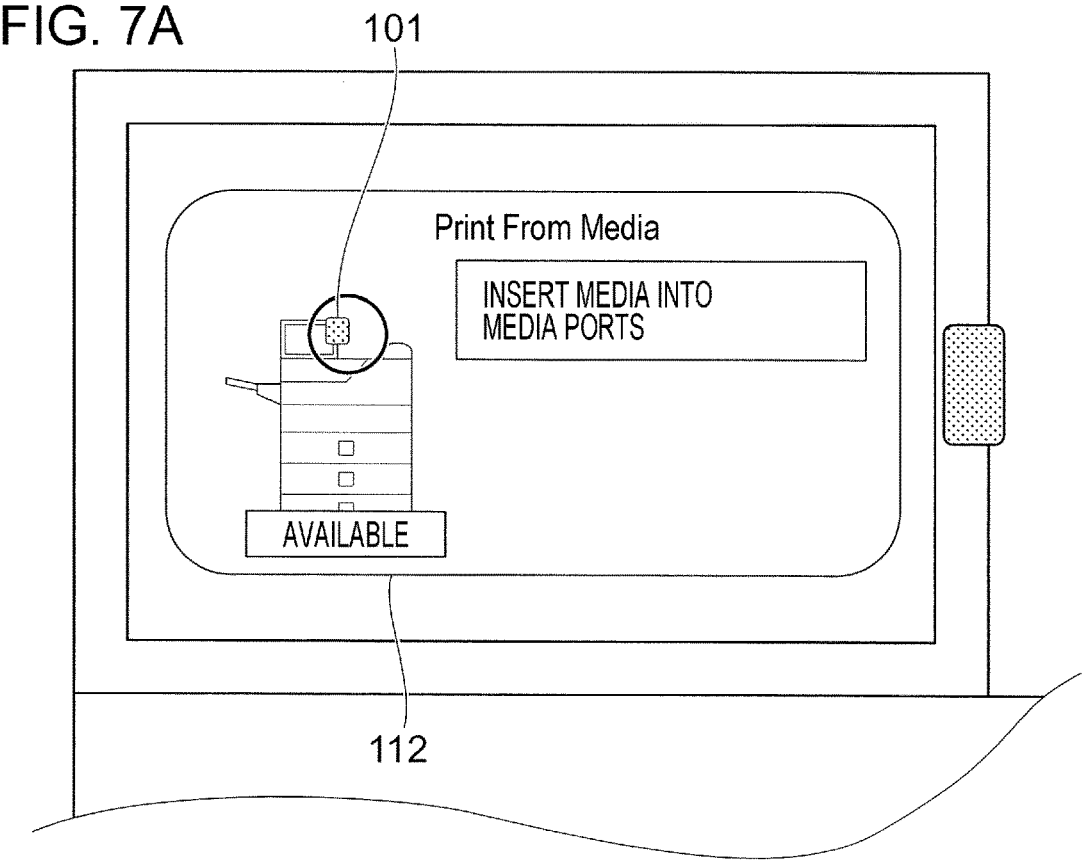
FIG. 7A and FIG. 7B illustrates a media port notification screen displayed on the local UI of the image processing apparatus.
Figure 7B:
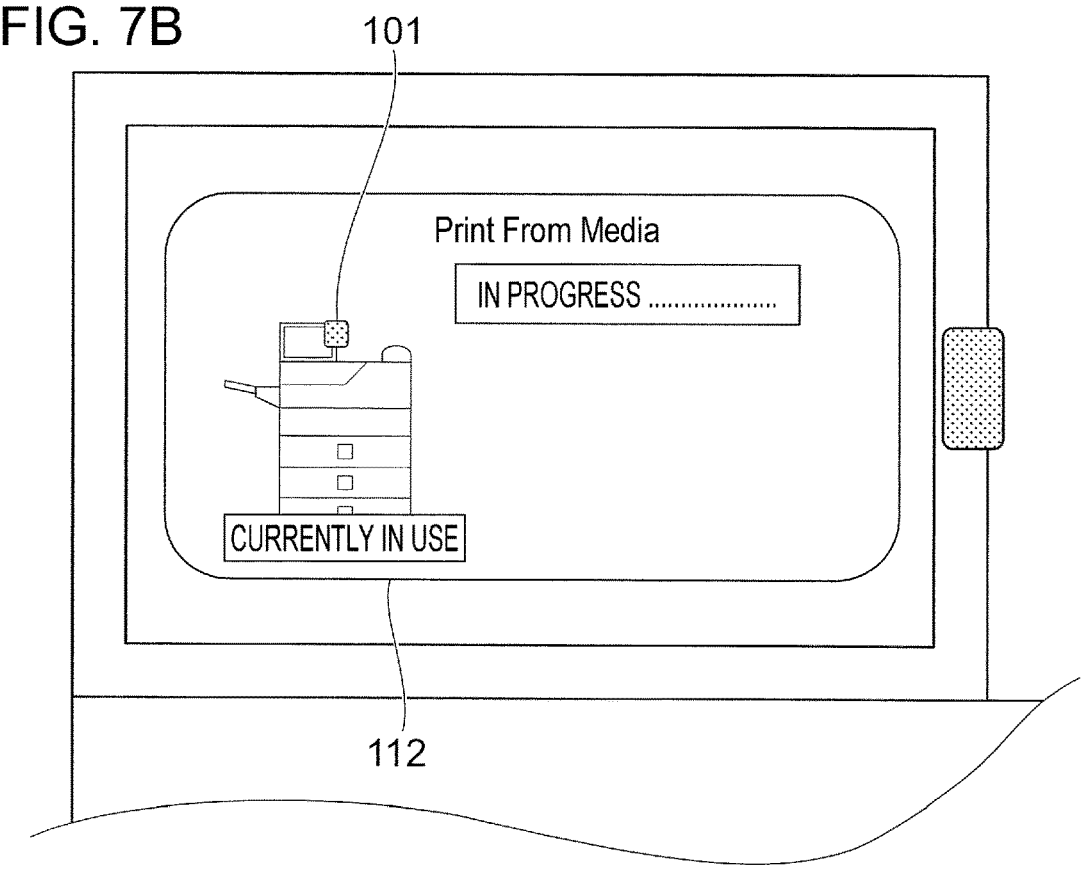

FIG. 7A and FIG. 7B illustrate media port notification screens 112 that are presented on the local UI when the user A locally logs in on the image processing apparatus 10 while a user B remotely logs in on the image processing apparatus 10 using the portable terminal 20b. FIG. 7A illustrates the media port notification screen 112 when the user A starts using a media usage application on the local UI with no media inserted into the media port 101. In other words, even if the user B is using the media usage application on the remote UI, the local UI displays only information of the media port 101 of the image processing apparatus 10 available to the user A. Even if the user B is printing on the image processing apparatus 10 data stored on the media inserted the medial ports 201 and 202 of the portable terminal 20b, such a media port notification screen 212 is displayed. For example, the user B may now use "PrintFromMedia" on the remote UI. Since multi-login is supported, the user A may use "PrintFromMedia" using the media port 101 of the image processing apparatus 10. FIG. 7B illustrates the media port notification screen 112 when the user A inserts a medium in the media port 101. Since the multi-login is supported, both the user A and the user B may use the media usage application. In such a case, as well, only information concerning the media port 101 of the image processing apparatus 10 is displayed on the local UI.

Figure 8A:
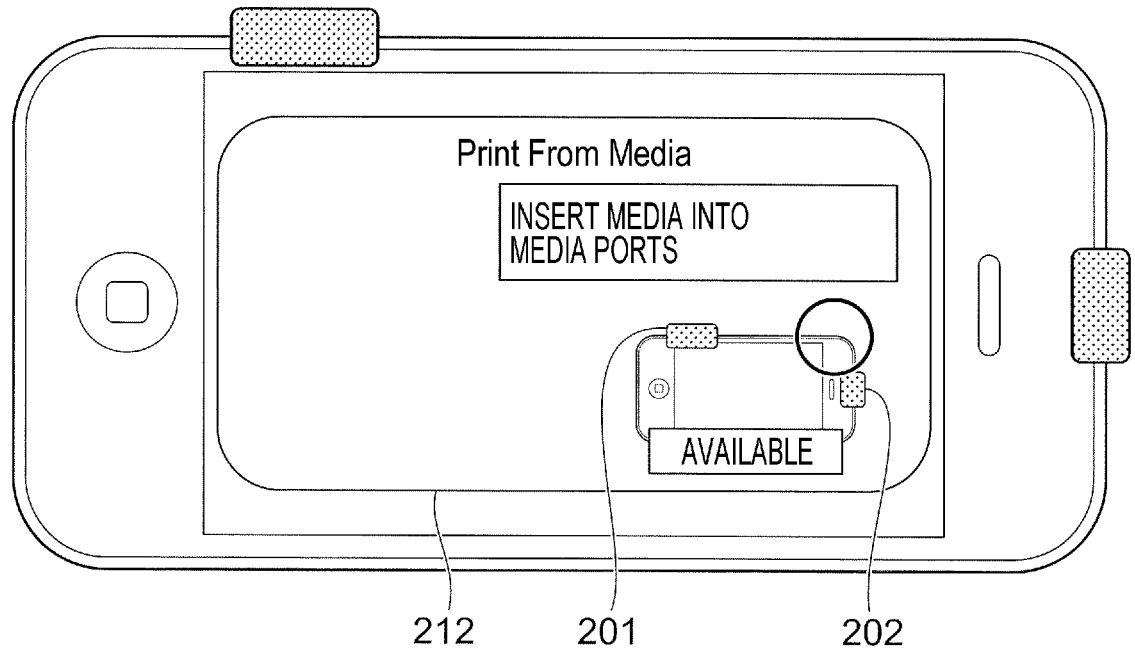
FIG. 8A and FIG. 8B illustrates a media port notification screen displayed on the remote UI of the portable terminal.
Figure 8B:
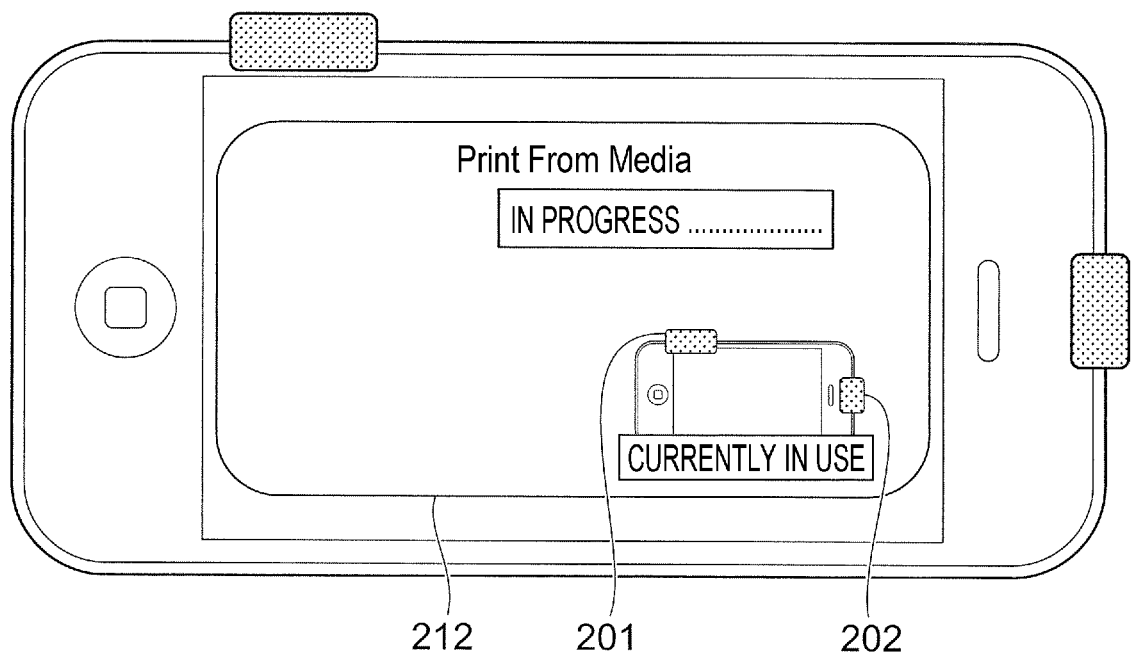

FIG. 8A and FIG. 8B illustrate the media port notification screens 212 displayed on the remote UI when the user A locally logs in on the image processing apparatus 10 while the user B logs in on the image processing apparatus 10 using the portable terminal 20b. FIG. 8A illustrates the media port notification screen 212 when the user B starts using the media usage application on the remote UI with no media inserted into the media ports 201 and 202. In other words, even if the user A is using the media usage application on the local UI, the remote UI displays only information of the media ports 201 and 202 of the portable terminal 20b available to the user B. Even if the user A is printing on the image processing apparatus 10 data stored on a medium inserted into the media port 101 of the image processing apparatus 10, such a media port notification screen 212 is displayed. For example, the user A may now use "PrintFromMedia" on the local UI. Since the multi-login is supported, "PrintFromMedia" using the media ports 201 and 202 of the portable terminal 20b is available to the user B. FIG. 8B illustrates the media port notification screen 212 when the user B inserts a medium in one of the media ports 201 and 202. Since the multi-login is supported, both the user A and the user B may use the media usage application. In such a case, as well, only information concerning the media ports 201 and 202 of the portable terminal 20b is displayed on the remote UI.

Figure 9:
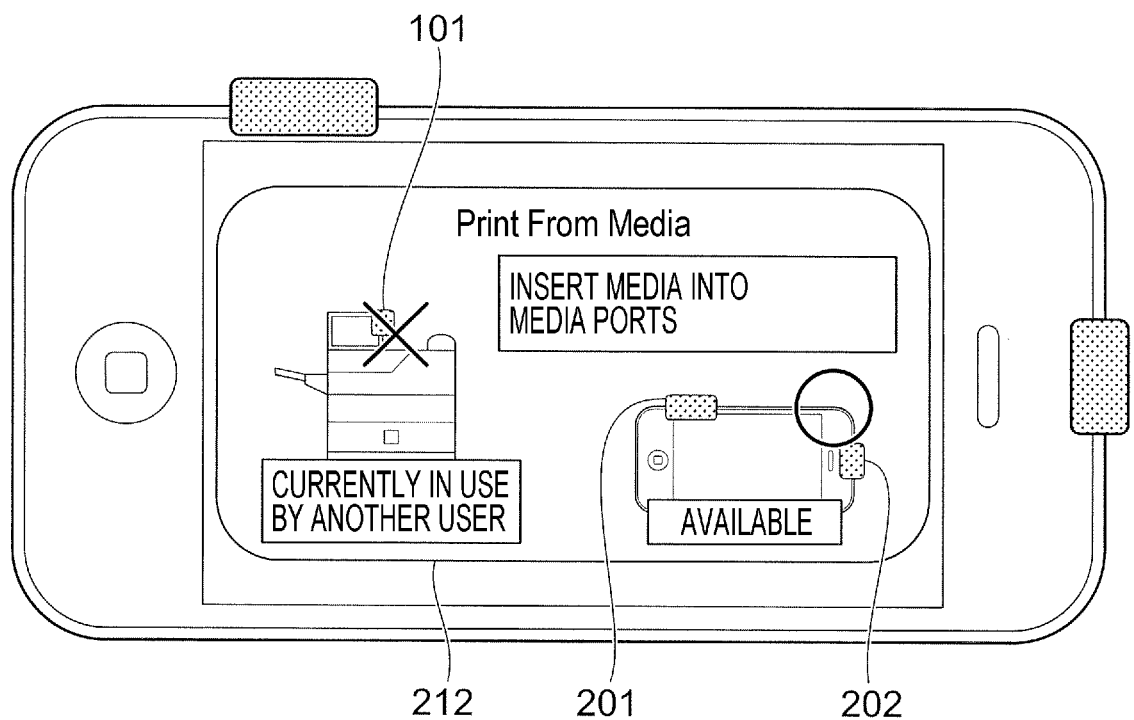
FIG. 9 illustrates a media port notification screen displayed on the remote UI of the portable terminal.

FIG. 9 illustrates the media port notification screens 212 displayed on the remote UI when the user A locally logs in on the image processing apparatus 10 while the user B remotely logs in on the image processing apparatus 10 using the portable terminal 20b. In a standard mode as illustrated in FIG. 8A, the remote UI displays only information concerning the medial ports 201 and 202 of the portable terminal 20b available to the user B. However, the user B is presumed to have a predetermined authorization, such as the right of an administrator, information of the media port 101 the user A as another user is currently using.

The media port notification screen 112 and the media port notification screen 212 are illustrated in FIG. 5A and FIG. 5A through FIG. 9 for exemplary purposes only, and a variety of screens may be used. The media port notification screen 112 of FIG. 6A displays both the information of the media port 101 of the image processing apparatus 10 and the information of the medial ports 201 and 202 of the portable terminal 20. Alternatively, the media port notification screen 112 may display only the information of the medial ports 201 and 202 of the portable terminal 20. The media port notification screen 212 of each of FIG. 5A, FIG. 5B, FIG. 6B, and FIG. 9 displays both the information of the media port 101 of the image processing apparatus 10 and the information of the medial ports 201 and 202 of the portable terminal 20. Alternatively, the media port notification screen 212 may display only the information of the medial ports 201 and 202 of the portable terminal 20.

Figure 10:
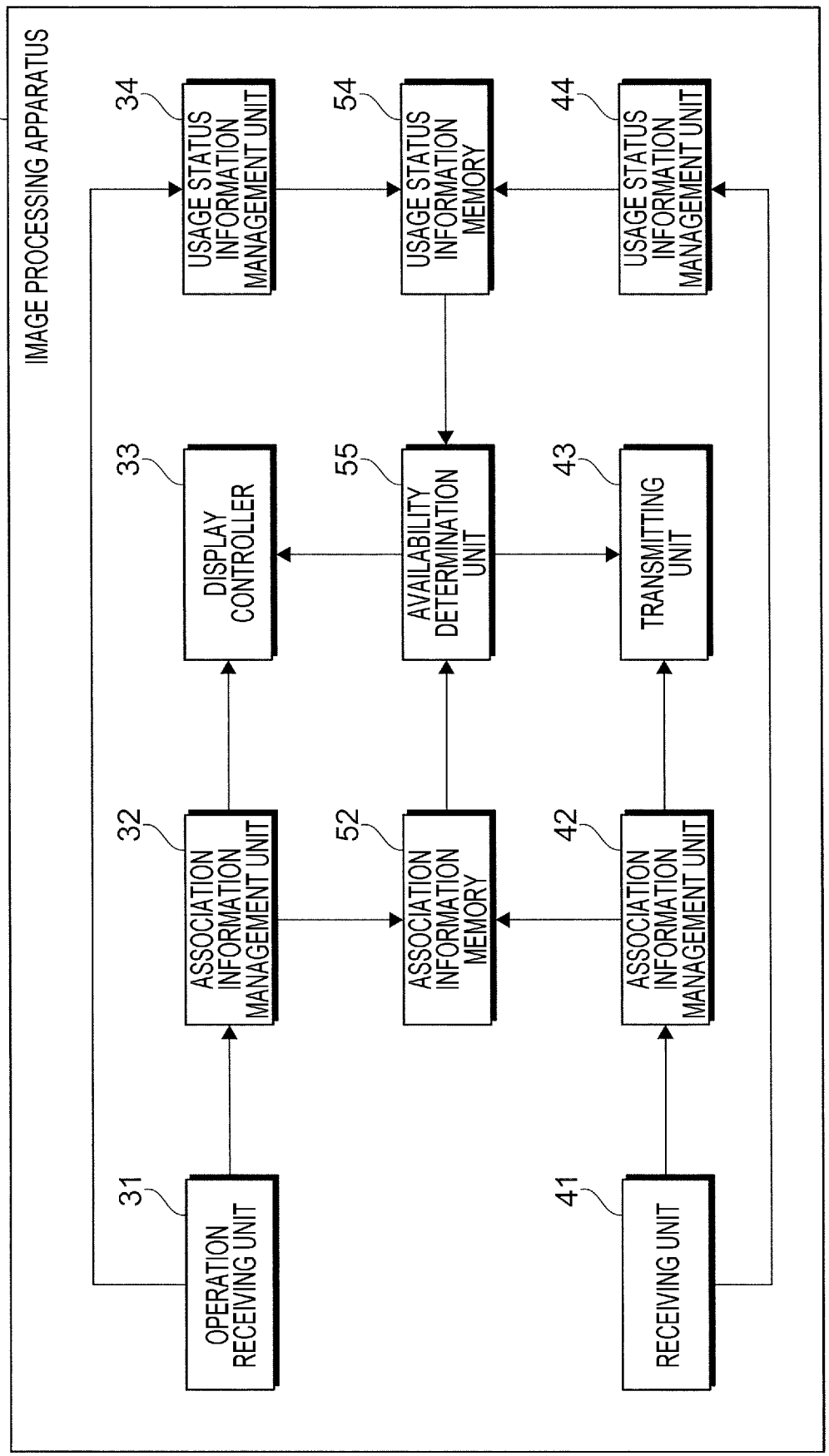
FIG. 10 is a functional block diagram of the image processing apparatus of the exemplary embodiment of the present invention.

FIG. 10 is a functional block diagram of the image processing apparatus 10 that displays the local UI or the remote UI described above. As illustrated in FIG. 10, the image processing apparatus 10 includes an operation receiving unit 31, an association information management unit 32, a display controller 33, and a usage status information management unit 34. The image processing apparatus 10 further includes a receiving unit 41, an association information management unit 42, a transmitting unit 43, and a usage status information management unit 44. The image processing apparatus 10 further includes an association information memory 52, a usage status information memory 54, and an availability determination unit 55.

When the user performs a login operation on the local UI of the image processing apparatus 10, the operation receiving unit 31 receives the login operation and outputs to the association information management unit 32 information that the login operation has been received. When the user performs an operation to select a media usage application on the application selection screen 111 displayed on the local UI, the operation receiving unit 31 receives the operation, and outputs to the usage status information management unit 34 information that the operation has been received. Furthermore, when the user performs an operation to end the use of the media port 101 on the local UI, the operation receiving unit 31 receives the operation, and then outputs to the association information management unit 32 and the usage status information management unit 34 information that the operation has been received.

When the association information management unit 32 is notified that the operation receiving unit 31 has received the login operation performed by the user on the local UI, the association information management unit 32 acquires information indicating a user (login user) who has logged in (hereinafter referred to as "login user information"), and information indicating a capability of the image processing apparatus 10, for example, a location where a media port is disposed (hereinafter referred to as "device capability information"). The association information management unit 32 stores on the association information memory 52 association information that associates these pieces of information. When the association information management unit 32 is notified that the operation receiving unit 31 has received the input operation to end the use of the media port 101, the association information management unit 32 deletes the association information that is previously stored on the association information memory 52.

The display controller 33 controls each of various screens to be displayed on the local UI. The various screens include the application selection screen 111 used when the user selects an application, and the media port notification screen 112 that indicates information concerning the media port 101 of the image processing apparatus 10 or the medial ports 201 and 202 of the portable terminal 20 presented when the user selects the media usage application on the application selection screen 111. In accordance with the exemplary embodiment, the information concerning the medial ports 201 and 202 is used as an example of the information identifying a second function as a function of another apparatus. The display controller 33 serves as an example of a display that displays that information on the image processing apparatus.

When the usage status information management unit 34 is notified that the operation receiving unit 31 has received the user's operation to select the media usage application on the application selection screen 111, the usage status information management unit 34 checks the usage status of the media port 101 of the image processing apparatus 10, and stores information indicating the usage status (hereinafter referred to as "usage status information") onto the usage status information memory 54. When the usage status information management unit 34 is notified that the operation receiving unit 31 has received the user's input operation to end the use of the media port 101, the usage status information management unit 34 deletes the usage status information previously stored on the usage status information memory 54.

When the user performs a login operation on the remote UI of the portable terminal 20, the receiving unit 41 receives information indicating that the login operation is performed. The receiving unit 41 then outputs to the association information management unit 42 information that the receiving unit 41 has received the information indicating that the login information is performed. When the user performs an operation to select the media usage application on the application selection screen 211 displayed on the remote UI, the receiving unit 41 receives information that the operation has been performed, and then outputs to the usage status information management unit 44 information that the information has been received. When the user performs an input operation to end the use of the medial ports 201 and 202 on the remote UI, the receiving unit 41 receives information that the operation has been performed, and outputs to the association information management unit 42 and the usage status information management unit 44 information that the operation has been performed. In accordance with the exemplary embodiment, the receiving unit 41 serves as an example of a receiving unit that receives from the other apparatus a command to perform an operation to use the first function of the image processing apparatus.

When the association information management unit 42 is notified that the receiving unit 41 has received the information indicating that the has performed the login operation on the remote UI, the association information management unit 42 acquires information indicating the login user (login user information), and information indicating the capability of the portable terminal 20, for example, indicating a location of the portable terminal 20 where a media port is disposed, and stores onto the association information memory 52 association information that associates these pieces of information. When the association information management unit 42 is notified that the receiving unit 41 has received the information that the user has performed the input operation to end the use of the medial ports 201 and 202, the association information management unit 42 deletes the association information previously stored on the association information memory 52.

The transmitting unit 43 transmits each of the various screens to display the screen on the remote UI. The various screens include the application selection screen 211 used when the user selects an application, and the media port notification screen 212 that indicates information concerning the media port 101 of the image processing apparatus 10 or the medial ports 201 and 202 of the portable terminal 20 presented when the user selects the media usage application on the application selection screen 211. In accordance with the exemplary embodiment, the transmitting unit 43 is arranged as an example of an instructing unit that issues to the other apparatus a command to use the second function as the function of the other apparatus. The information concerning the medial ports 201 and 202 is used as an example of information that identifies the second information as the function of the other apparatus. The transmitting unit 43 is arranged as an example of an instructing unit that issues to the other apparatus a command to display the information concerning the medial ports 201 and 202.

When the usage status information management unit 44 is notified that the receiving unit 41 has received the information indicating that the user has performed the operation to select the media usage application on the application selection screen 211, the usage status information management unit 44 checks the usage status of the media port 101 of the image processing apparatus 10 and the medial ports 201 and 202 of the portable terminal 20 and stores information indicating the usage status (the usage status information) onto the usage status information memory 54. When the usage status information management unit 44 is notified that the receiving unit 41 has received the information that the user has performed the input operation to end the use of the medial ports 201 and 202, the usage status information management unit 44 deletes the usage status information previously stored on the usage status information memory 54.

In response to a command from the association information management unit 32 or the association information management unit 42, the association information memory 52 stores the association information that associates the login user information indicating the login user with the device capability information concerning a capability indicating a location of the apparatus where a media portion is arranged. Note that the association information memory 52 may be arranged on a server (not illustrate) connected to the network. In such a case, storage contents may be inquired of via network communication.

In response to a command from the usage status information management unit 34 or the usage status information management unit 44, the usage status information memory 54 stores the usage status information indicating the usage status of each of the media port 101 of the image processing apparatus 10 and the medial ports 201 and 202 of the portable terminal 20. Note that the usage status information memory 54 may be arranged on a server (not illustrate) connected to the network. In such a case, storage contents may be inquired of via network communication.

The availability determination unit 55 references the association information the association information management unit 32 stores on the association information memory 52, the association information the association information management unit 42 stores on the association information memory 52, the usage status information the usage status information management unit 34 stores on the usage status information memory 54, and the usage status information the usage status information management unit 44 stores on the usage status information memory 54. By referencing these pieces of information, the availability determination unit 55 determines whether the media port 101 of the image processing apparatus 10 and the medial ports 201 and 202 of the portable terminal 20 are available to the login user. The availability determination unit 55 then outputs the determination results to the display controller 33 such that the determination results are reflected on the media port notification screen 112 and outputs the determination results to the transmitting unit 43 such that the determination results are reflected on the media port notification screen 212.

Figure 11:
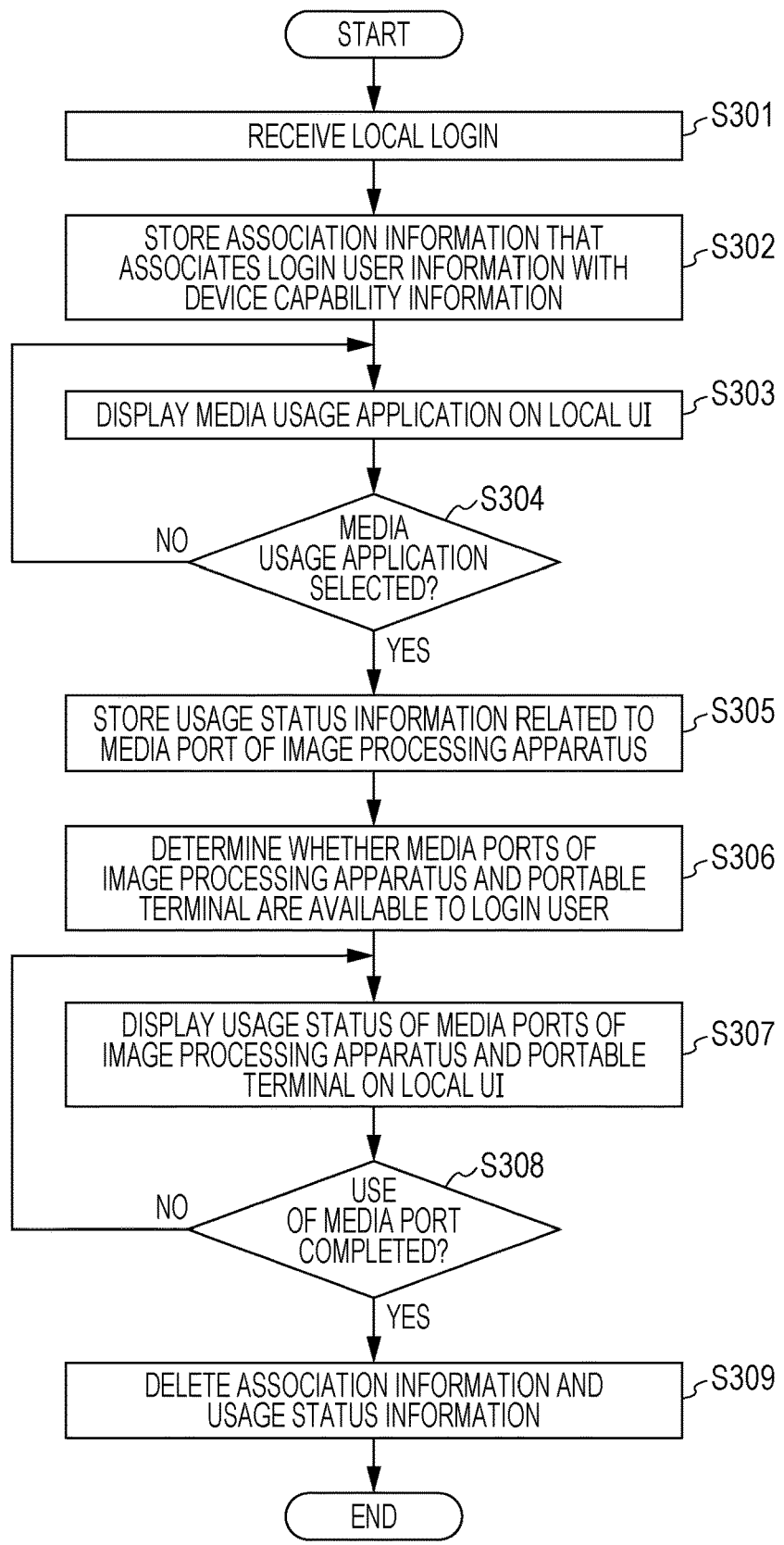
FIG. 11 is a flowchart illustrating a local login of the image processing apparatus of the exemplary embodiment of the present invention.

FIG. 11 is a flowchart illustrating the local login of the image processing apparatus 10 of the exemplary embodiment of the present invention.

When the user locally logs in on the image processing apparatus 10 as illustrated in FIG. 11, the operation receiving unit 31 in the image processing apparatus 10 receives the local login (step S301). The association information management unit 32 stores onto the association information memory 52 the association information that associates the login user information indicating the login user with the device capability information indicating the capability of the apparatus, for example, as to whether the image processing apparatus 10 has the media port 101 (step S302). The display controller 33 displays the media usage application on the local UI (step S303). More specifically, the display controller 33 controls the operation panel 15 such that the application selection screen 111 including the media usage application is displayed on the local UI.

The operation receiving unit 31 determines whether the user has selected the media usage application displayed in step S303 (step S304). Upon determining that the user has not selected the media usage application, the operation receiving unit 31 repeats steps S303 and S304. On the other hand, when the operation receiving unit 31 determines that the user has selected the media usage application, the usage status information management unit 34 verifies the usage status of the media port 101 of the image processing apparatus 10 and stores on the usage status information memory 54 the usage status information indicating the usage status (step S305). The usage status information management unit 34 verifies the usage status to determine whether to display the message reading "Insert media into media ports", the message "In progress" and other messages as illustrated in FIG. 5A and FIG. 5B through FIG. 9.

When the association information is stored on the association information memory 52 and the usage status information is stored on the usage status information memory 54, the availability determination unit 55 references these pieces of information to determine whether the media port 101 of the image processing apparatus 10 and the medial ports 201 and 202 of the portable terminal 20 are available to the login user (step S306). More specifically, the device capability information associated with the login user information indicating the login user is acquired using the association information stored on the association information memory 52, and the media port 101 of the image processing apparatus 10 and the medial ports 201 and 202 of the portable terminal 20 are thus identified. The usage statuses of the media ports 101, 201, and 202 indicated by the usage status information stored on the usage status information memory 54 are verified. A determination is made to determine whether the media ports 101, 201, and 202 are available to the log in user.

The display controller 33 displays on the local UI the usage statuses of the media port 101 of the image processing apparatus 10 and the medial ports 201 and 202 of the portable terminal 20 of the login user (step S307). More specifically, the display controller 33 controls the operation panel 15 to display on the local UI the media port notification screen 112 including the media port 101 of the image processing apparatus 10 and the medial ports 201 and 202 of the portable terminal 20.

The operation receiving unit 31 determines whether the user has completed the use of the media port 101 of the image processing apparatus 10 and the medial ports 201 and 202 of the portable terminal 20 (step S308). If the operation receiving unit 31 determines that the user has not completed the use of the media port 101 of the image processing apparatus 10 and the medial ports 201 and 202 of the portable terminal 20, the operation receiving unit 31 repeats steps S307 and S308. On the other hand, if the operation receiving unit 31 determines that the user has completed the use of the media port 101 of the image processing apparatus 10 and the medial ports 201 and 202 of the portable terminal 20, the association information management unit 32 deletes the association information stored in step S302, and the usage status information management unit 34 deletes the usage status information stored in step S305 (step S309). The process thus ends.

Figure 12:
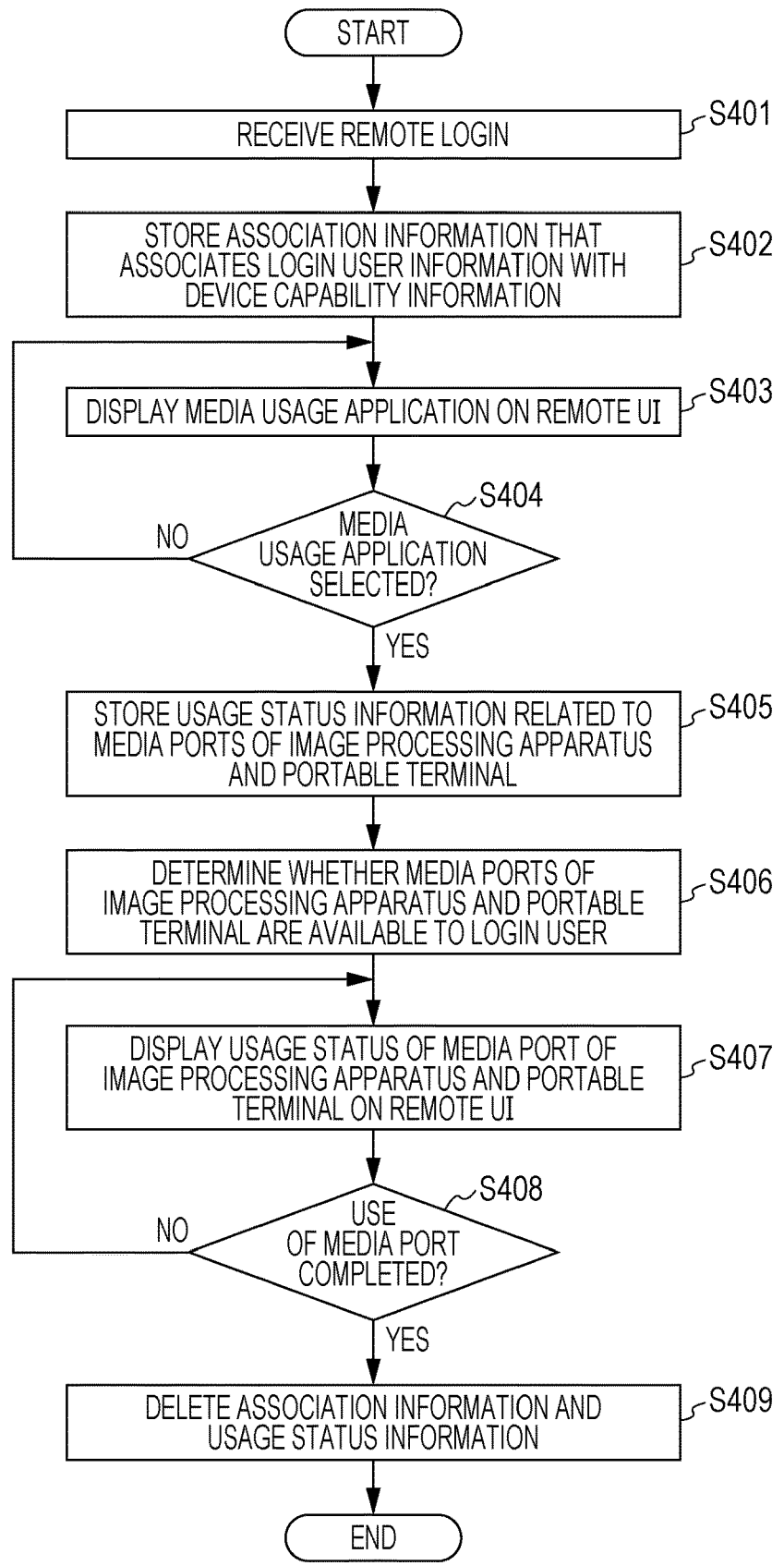
FIG. 12 is a flowchart illustrating a remote login of the image processing apparatus of the exemplary embodiment of the present invention.

FIG. 12 is a flowchart illustrating the remote login of the image processing apparatus 10 of the exemplary embodiment of the present invention.

When the user remotely logs in on the image processing apparatus 10 as illustrated in FIG. 12, the operation receiving unit 41 in the image processing apparatus 10 receives information that the remote login has been performed (step S401). The association information management unit 42 stores onto the association information memory 52 the association information that associates the login user information indicating the login user with the device capability information indicating the capability of the apparatus, for example, as to whether the portable terminal 20 has the medial ports 201 and 202 (step S402). The transmitting unit 43 displays the media usage application on the remote UI (step S403). More specifically, the transmitting unit 43 transmits the application selection screen 211 including the media usage application to the portable terminal 20 such that the application selection screen 211 including the media usage application is displayed on the remote UI.

The receiving unit 41 determines whether the information that the user has selected the media usage application displayed in step S403 has been received (step S404). Upon determining that the information that the user has selected the media usage application has not been received, the receiving unit 41 repeats steps S403 and S404. On the other hand, if the receiving unit 41 determines that the information that the user has selected the media usage application has been received, the usage status information management unit 44 verifies the usage statuses of the media port 101 of the image processing apparatus 10 and the medial ports 201 and 202 of the portable terminal 20 and stores on the usage status information memory 54 the usage status information indicating the usage status (step 405). The usage status information management unit 34 verifies the usage status to determine whether to display the message reading "Insert media into media ports", the message "In progress" and other messages as illustrated in FIG. 5A and FIG. 5B through FIG. 9. The usage status information management unit 34 verifies not only the usage status of the medial ports 201 and 202 of the portable terminal 20 but also the media port 101 of the image processing apparatus 10 because if no user locally logs in on the image processing apparatus 10 as illustrated in FIG. 5A and FIG. 5B, the usage status of the media port 101 of the image processing apparatus 10 is not verified in the flowchart of FIG. 11. In this sense, in step S405, the usage status of the media port 101 of the image processing apparatus 10 may be verified only if there is no user who has locally logged in on the image processing apparatus 10.

When the association information is stored on the association information memory 52 and the usage status information is stored on the usage status information memory 54, the availability determination unit 55 references these pieces of information to determine whether the media port 101 of the image processing apparatus 10 and the medial ports 201 and 202 of the portable terminal 20 are available to the login user (step S406). Specifically, the device capability information associated with the login user information indicating the login user is acquired using the association information stored on the association information memory 52, and the media port 101 of the image processing apparatus 10 and the medial ports 201 and 202 of the portable terminal 20 are thus identified. The usage statuses of the media ports 101, 201, and 202 indicated by the usage status information stored on the usage status information memory 54 are recognized. A determination is made to determine whether the media ports 101, 201, and 202 are available to the login user.

The transmitting unit 43 displays on the remote UI the usage statuses of the media port 101 of the image processing apparatus 10 and the medial ports 201 and 202 of the portable terminal 20 of the login user (step S407). More specifically, the transmitting unit 43 transmits to the portable terminal 20 the information to be displayed such that the media port notification screen 212 including the usage statuses of the media port 101 of the image processing apparatus 10 and the medial ports 201 and 202 of the portable terminal 20 are displayed on the remote UI.

The receiving unit 41 determines whether the information that the user has completed the use of the media port 101 of the image processing apparatus 10 and the medial ports 201 and 202 of the portable terminal 20 has been received (step S408). If the receiving unit 41 has not received the information that the user has completed the use of the media port 101 of the image processing apparatus 10 and the medial ports 201 and 202 of the portable terminal 20, the receiving unit 41 repeats steps S407 and S408. On the other hand, if the receiving unit 41 has received the information that the user has completed the use of the media port 101 of the image processing apparatus 10 and the medial ports 201 and 202 of the portable terminal 20, the association information management unit 42 deletes the association information stored in step S402, and the usage status information management unit 44 deletes the usage status information stored in step S405 (step S409). The process thus ends.

In accordance with the exemplary embodiment, the media port notification screen 212 is displayed on the portable terminal 20 regardless of whether the media port 101 of the image processing apparatus 10 is used or not. The present invention is not limited to this method. Alternatively, the media port notification screen 212 may be displayed on the portable terminal 20 only if the media port 101 of the image processing apparatus 10 is used by another user.

In accordance with the exemplary embodiment, each of the image processing apparatus 10 and the portable terminal 20 has a media port function. The present invention is not limited to this arrangement. The function of the portable terminal 20 may be used in place of the function of the image processing apparatus 10, although the two functions are not completely identical. For example, the image processing apparatus 10 may have the function of the image reading unit 16 (scanner), and the portable terminal 20 may have the function of a camera (not illustrated). As a modification in such a case, if the scanner is being used when a user attempts to start using the scanner, the portable terminal 20 may be notified that the camera of the portable terminal 20 may be available.

If the image forming unit 17 (printer) of the image processing apparatus 10 is used in the modification, the portable terminal 20 may acquire an image through the camera, convert the acquired image into an image in intermediate language, and transmit the image in the intermediate language to the image processing apparatus 10. If the use of the printer is suspended in the middle of the conversion of the image in the intermediate language, the conversion to the intermediate language is suspended. The acquired image may be transmitted as it is to the image processing apparatus 10.

In the modification as well, the portable terminal 20 may convert the image acquired via the medial port 201 or 202 or the image acquired through the camera (not illustrated) in accordance with a value set on the screen transmitted from the image processing apparatus 10, and may transmit the converted image to the image processing apparatus 10. Alternatively, only if the set value is for monochrome printing or low-resolution printing, the acquired image may be converted in accordance with the set value, and the converted image may be transmitted to the image processing apparatus 10.

The process of the image processing apparatus 10 of the exemplary embodiment is prepared as an application software program.

More specifically, the program implements the exemplary embodiment and causes a computer to execute a process for processing information. The process includes receiving from another apparatus a command to perform an operation that uses a first function as a function of a processing apparatus, and when the command is received from the other apparatus, issuing to the other apparatus a command to perform an operation that uses a second function if the other apparatus has the second function that is a substitute for the first function.

The program implementing the exemplary embodiment may be provided not only via communication but also in a recorded form on a recording medium, such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a communication interface;
   a processor programmed to:
     receive, via the communication interface from another apparatus used by a second user, a command to perform an operation that uses a first media port configured to read electronic media of the image processing apparatus; and
     when the processor has received the command from the other apparatus while a first user other than the second user is using the first media port, issue to the other apparatus via the communication interface a command:
       (1) to display a screen that indicates the first media port is not available and a second media port is available, or
       (2) to display a screen that indicates a second media port is available and not to display a usage status of the first media port,
     if the other apparatus includes as a component the second media port that is a substitute for the first media port.

2. The image processing apparatus according to claim 1, wherein the processor issues to the other apparatus a command not to display the usage status of the image processing apparatus if a second user other than a first user who is authorized to use the image processing apparatus by operating the image processing apparatus is authorized to use the image processing apparatus by operating the other apparatus.

3. The image processing apparatus according to claim 2, wherein the processor issues to the other apparatus a command to further display the usage status of the first media port of the image processing apparatus if the second user has a predetermined authorization.

4. The image processing apparatus according to claim 1, further comprising a display that displays, on the image processing apparatus, information that identifies the second media port of the other apparatus.

5. The image processing apparatus according to claim 4, wherein the display further displays, on the image processing apparatus, a usage status of the first media port of the image processing apparatus if a user who is authorized to use the image processing apparatus by operating the image processing apparatus is authorized to use the image processing apparatus by operating the other apparatus.

6. A non-transitory computer readable medium storing a program causing a computer to execute a process for processing image information, the process comprising:
   receiving, from another apparatus used by a second user, a command to perform an operation that uses a first media port configured to read electronic media of an image processing apparatus; and
   when the command is received from the other apparatus while a first user other than the second user is using the first media port, issuing to the other apparatus a command:
     (1) to display a screen that indicates the first media port is not available and a second media port is available, or
     (2) to display a screen that indicates a second media port is available and not to display a usage status of the first media port,
   if the other apparatus includes as a component the second media port that is a substitute for the first media port.

* * * * *